United States Patent [19]

Black

[11] Patent Number: 4,559,668

[45] Date of Patent: Dec. 24, 1985

[54] WHEEL BRAKING MECHANISM FOR A WHEEL BRACKET ASSEMBLY

[75] Inventor: John W. Black, Hickory Corners, Mich.

[73] Assignee: Pemco-Kalamazoo, Inc., Kalamazoo, Mich.

[21] Appl. No.: 701,443

[22] Filed: Feb. 13, 1985

Related U.S. Application Data

[63] Continuation of Ser. No. 430,166, Sep. 30, 1982, abandoned.

[51] Int. Cl.[4] .............................................. B60B 33/02
[52] U.S. Cl. ........................................ 16/35 R; 16/21
[58] Field of Search ................. 16/18 R, 20, 21, 35 R; 188/1.12, 74, 78

[56] References Cited

U.S. PATENT DOCUMENTS

| 1,733,536 | 10/1929 | Guitschula . | |
|---|---|---|---|
| 1,998,236 | 4/1935 | Herold | 188/74 |
| 2,096,229 | 10/1937 | Dudley | 16/35 |
| 2,147,064 | 2/1939 | Schultz, Jr. | 16/35 |
| 2,253,824 | 8/1941 | Townsend et al. | 16/35 R |
| 2,262,433 | 11/1941 | Vecker et al. | 16/35 R |
| 2,345,442 | 3/1944 | Winter et al. | 16/35 R |
| 2,366,927 | 1/1945 | Noelting et al. | 16/35 R |
| 2,695,683 | 11/1954 | Forbes | 188/77 |
| 2,707,794 | 5/1955 | Kramisak | 16/35 R |
| 2,905,275 | 9/1959 | Kostolecki et al. | 188/74 |
| 2,987,141 | 6/1961 | Brooks | 16/35 R |
| 3,228,089 | 1/1966 | Turner | 16/21 X |
| 4,348,784 | 9/1982 | Fontana | 16/21 X |

FOREIGN PATENT DOCUMENTS

| 2505070 | 8/1976 | Fed. Rep. of Germany | 16/35 R |
| 0053346 | 4/1977 | Japan | 16/35 R |

Primary Examiner—Donald R. Schran
Assistant Examiner—James Wolfe
Attorney, Agent, or Firm—Flynn, Thiel, Boutell & Tanis

[57] ABSTRACT

A caster with a braking apparatus includes a bracket and a wheel rotatably supported on the bracket, the wheel having a radially inwardly facing annular braking surface thereon between its axle and tread. A braking member has a braking surface thereon adjacent the braking surface on the wheel, and is supported for radial movement between braking and retracted positions in which the braking surface thereon is engaging and free of engagement with the braking surface on the wheel. Radial movement of the braking member is effected by a manually actuable lever. In a preferred embodiment, the bracket is pivotally supported on a bracket support and a further braking surface is provided on the bracket support. A braking element has a braking surface facing the braking surface on the bracket support and is moved by manual actuation of the lever between actuated and deactuated positions in which the braking surface thereon is respectively engaging and free of engagement with the braking surface on the bracket support.

16 Claims, 9 Drawing Figures

WHEEL BRAKING MECHANISM FOR A WHEEL BRACKET ASSEMBLY

This application is a continuation of U.S. Ser. No. 430,166, filed Sept. 30, 1982 now abandoned.

FIELD OF THE INVENTION

This invention relates to an improved wheel braking apparatus for use on push/pull carts, beds, furniture or the like and, more particularly, to an improved braking apparatus which is adapted to prevent rotation of a wheel on a fixed frame or yoke or a caster wheel and/or prevent a pivotal movement of the caster yoke relative to its pivot axis.

BACKGROUND OF THE INVENTION

Wheels rotatably supported on fixed wheel brackets or yokes and casters are used in a wide range of industrial and commercial applications, and in many of these applications it is desirable to have a releasable braking apparatus incorporated into the wheel support structure to prevent rotational movement of the wheel. Further, in some applications wherein the wheel support structure is pivotal, it is desirable for the braking apparatus to be adapted to simultaneously prevent rotational movement of the wheel support structure relative to its pivot axis.

Wheels of the aforesaid type are typically supported for rotation by a bearing structure which is designed to withstand relatively large radial forces but is not adapted to withstand large axial forces. Thus, braking mechanisms which apply axially directed forces to one or both sides of a wheel can frequently produce axial force components on the bearing structure and rapidly decrease the operational life of the bearing. Accordingly, braking mechanisms which exert substantially radially directed forces on the wheel are considered superior.

A number of braking mechanisms for applying a radially directed force to a wheel have previously been developed, for example those disclosed in U.S. Pat. Nos. 1,733,536, 1,998,236, 2,096,229, 2,147,064, 2,695,683, 2,707,794 and 2,905,275. Although these braking mechanisms have generally been adequate for their intended purposes, they have not been satisfactory in all respects. In particular, each of these braking mechanisms applies a radially directed force to the tread provided on the periphery of the wheel. This can in some cases accelerate wear of the tread and thus reduce the life time of the wheel. More importantly, normal operational wear of the wheel tread and the presence thereon of foreign substances such as dirt or oil picked up during normal use can significantly degrade the operation of the braking mechanism.

In addition, the braking mechanisms disclosed in these patents are typically somewhat complex and require the assembly of several parts which can be manufactured only by several machining operations. Several of these braking mechanisms also have parts which project axially beyond the side flanges of the wheel supporting bracket or yoke and are thus subject to possible damage from impacts with objects the wheel support structure passes during normal operational use.

Moreover, of the braking mechanisms disclosed in these patents, only that disclosed in U.S. Pat. No. 2,707,794 is adapted to simultaneously prevent rotation of the caster wheel and pivotal movement of the caster yoke. This mechanism, however, as mentioned above, applies braking forces to the tread of the caster wheel. Further, this mechanism is relatively complex and is fully exposed, thereby increasing the likelihood of damage from impacts and reducing the aesthetic appeal of the caster.

Accordingly, it is an object of the present invention to provide a braking mechanism for a small wheel which is simple and inexpensive to manufacture and assemble, and which consists of a minimum number of parts which are preferably made by plastic injection molding techniques.

It is a further object of the present invention to provide a braking mechanism, as aforesaid, which is also adapted to releasably prevent pivotal movement of a caster yoke relative to the apparatus it supports.

It is a further object of the present invention to provide a braking mechanism, as aforesaid, which can be engaged and disengaged quickly and with minimal effort, but which effects secure braking of the wheel and/or caster yoke.

It is a further object of the invention to provide a braking mechanism, as aforesaid, in which braking forces are applied radially to the wheel, and are applied to a braking surface thereon other than the wheel tread.

It is a further object of the invention to provide a braking mechanism, as aforesaid, which is rugged and durable and requires little or no maintenance.

It is as further object of the invention to provide a braking mechanism, as aforesaid, in which braking of the wheel and caster yoke is actuated by a single manually operable lever.

It is as further object of the invention to provide a braking mechanism, as aforesaid, which is relatively compact and is disposed axially within the confines of the side flanges of the wheel supporting yoke.

It is a further object of the invention to provide a braking mechanism, as aforesaid, which is aesthetically pleasing and at least partially hidden from view.

It is a further object of the invention to provide a braking mechanism, as aforesaid, which can be retrofit into existing wheel and bracket units without modification of the bracket or wheel. In units where a bolt has been used to rotatably support the wheel on the bracket, the retrofit can be effected quickly and with the use of only simple hand tools.

SUMMARY OF THE INVENTION

The objects and purposes of the invention, including those set forth above, are met by providing a wheel braking apparatus which includes a bracket and a wheel supported on the bracket for rotation about a first axis, the wheel having a tread on the periphery thereof and a generally annular and radially facing first braking surface concentric with its axis and located radially between the axis and the tread. A braking member has a generally radially facing second braking surface thereon which is adjacent the first braking surface provided on the wheel, the braking member being supported for substantially radial movement between braking and retracted positions in which the second braking surface is respectively in and substantially free of firm frictional engagement with the first braking surface. A manually actuable lever is cooperable with the braking member for effecting movement of the braking member between the braking and retracted positions.

An end cap is preferably disposed between the bracket and wheel and is fixed against rotation with respect to the bracket, the braking member being an elongate, arcuate, resiliently flexible braking shoe having one end fixedly secured to the end cap. The lever is supported on the end cap for pivotal movement about a second axis and has a cam surface thereon engageable with the braking shoe on a side thereof opposite the second braking surface for effecting the radial movement of the braking shoe between its braking and retracted positions in response to pivotal movement of the lever. The resilience of the braking shoe tends to urge it to its retracted position.

End caps are preferably provided on each side of the wheel, the lever being generally U-shaped and having two legs disposed on opposite sides of the wheel, the free end of each leg of the lever being pivotally supported on a respective end cap.

The bracket is preferably supported on a bracket support for pivotal movement about a second axis, and the bracket support has a generally annular third braking surface thereon concentric with the second axis. The braking mechanism includes a braking element having a fourth braking surface thereon and supported for movement between actuated and deactuated positions in which the fourth braking surface is respectively in and substantially free of firm frictional engagement with the third braking surface. The manually actuable lever is cooperable with both the braking element and the braking member and movement of the lever effects movement of the braking member and braking element from their retracted and deactuated positions, respectively, to their braking and actuated positions.

BRIEF DESCRIPTION OF THE DRAWINGS

Exemplary embodiments of the invention will be described in detail hereinafter in connection with the drawings, in which.

Figures 1, 2, 3, 4:
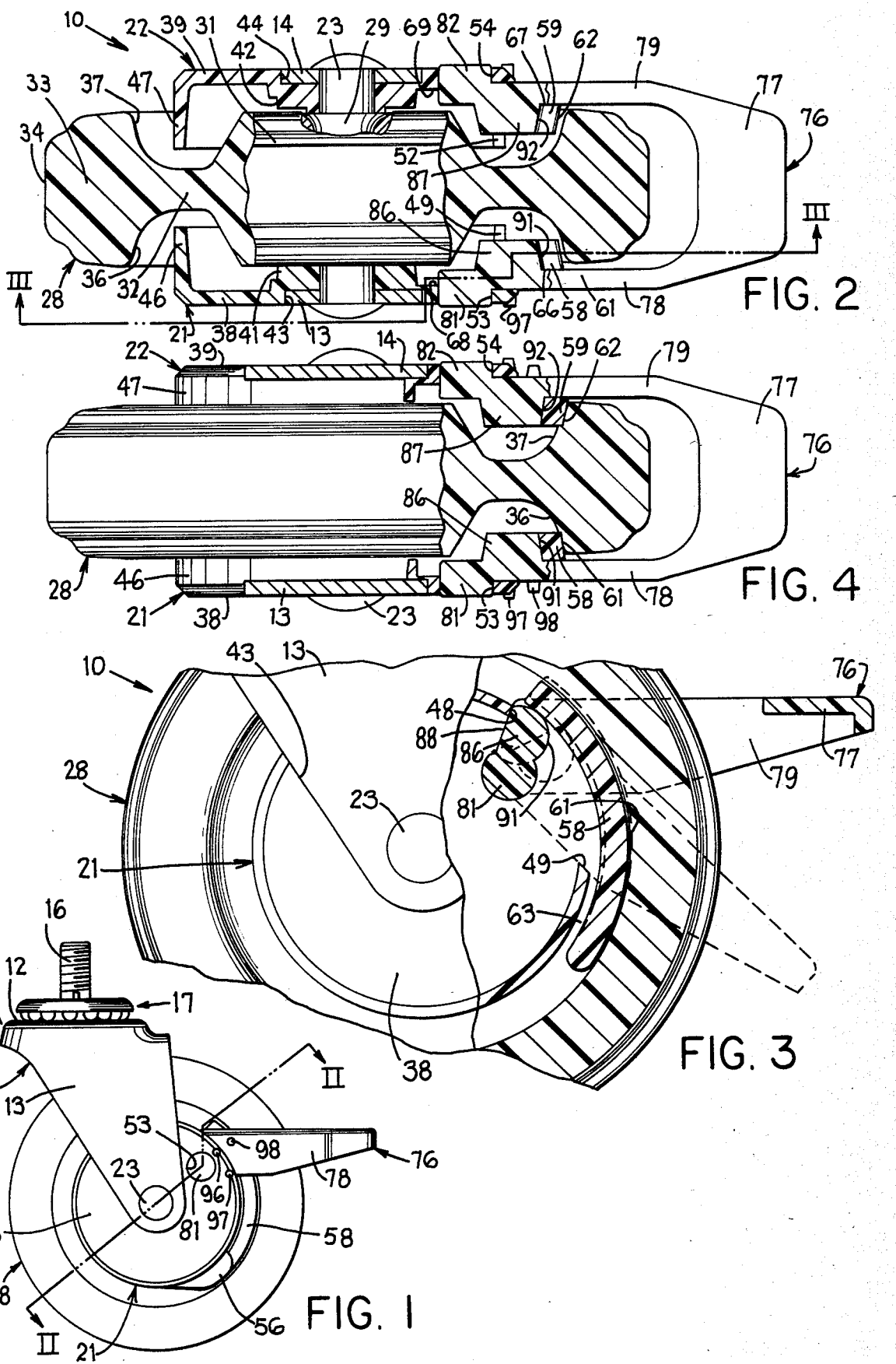
FIG. 1 is an elevational side view of a caster embodying the inventive braking mechanism.
FIG. 2 is a fragmentary sectional view taken along the line II—II of FIG. 1.
FIG. 3 is a fragmentary sectional view taken along the line III—III, of FIG. 2.
FIG. 4 is a fragmentary sectional view generally similar to FIG. 2 but showing the braking mechanism in a different position of operation.

Certain terminology is used herein for convenience in reference only and is not to be considered limiting. For example, the words "up" and "down" will designate directions in the drawings to which reference is made. The words "in" and "out" will respectively refer to directions toward and away from the geometric center of the caster and designated parts thereof. Such terminology will include the words specifically mentioned, derivatives thereof and words of similar import.

DETAILED DESCRIPTION

Referring to FIGS. 1 and 2, a caster 10 embodying the inventive braking apparatus includes a U-shaped yoke or bracket 11 having a bight 12 and spaced flanges 13 and 14.

The bight 12 of the yoke 11 is supported for pivotal movement about a vertical axis on a support member or inverted kingpin 16 by a bearing arrangement 17. The bearing arrangement 17 is conventional and therefore not described in detail, and is preferably substantially identical to that disclosed in U.S. Pat. No. 4,219,903, the disclosure of which is incorporated herein by reference.

End caps 21 and 22 are provided between and adjacent the respective flanges 13 and 14 of the yoke 11. An axle or rivet 23 extends through aligned openings in the flanges 13 and 14 and end caps 21 and 22 and each end thereof is upset against the flanges 13 and 14.

A wheel 28 is rotatably supported on the axle 23 by means of a bearing arrangement 29 which is not illustrated in detail. The bearing arrangement 29 is preferably substantially identical to that disclosed in U.S. Pat. No. 3,807,817, the disclosure of which is incorporated herein by reference. It will be recognized, however, that other axle and bearing arrangements could be utilized. For example, the axle and bearing arrangement disclosed in U.S. Pat. No. 4,122,580, the disclosure of which is incorporated herein by reference, could be substituted for the axle 23 and bearing arrangement 29 described above.

The wheel 28 includes a hub 31 having the bearing arrangement 29 supported in a central hole therethrough, a web 32 extending radially outwardly from the peripheral edge of the hub 31, and an annular rim 33 provided at the periphery of the web 32, the outer peripheral surface of the rim 33 serving as a tread 34. The axial width of the web 32 is substantially less than the axial width of the hub 31 and rim 33, and approximately radially facing annular braking 36 and 37 are provided on the rim 33 adjacent and on opposite sides of the web 32.

It will be recognized that the wheel 28 need not be made entirely from a single material, but could be made from two or more materials. For example, the tread 34 could be provided on an annular layer of material different from the remainder of the wheel 28 and bonded to the periphery thereof as shown for example in U.S. Pat. Nos. 4,294,491 and 4,295,686.

The end caps 21 and 22 are mirror images of each other. Each has a circular, approximately planar main wall 38 or 39 which is concentric with and substantially perpendicular to the axle 23, the axle 23 extending through a central opening therein. Cylindrical projections 41 and 42 project radially inwardly from the central portion of the respective main walls 38 and 39, the axle 23 extending concentrically therethrough. The upsets at the ends of the axle 23 maintain the axially inner surfaces of the projections 41 and 42 firmly against the axial ends of the bearing arrangement 29 to prevent axial movement of the bearing arrangement 29 and wheel 28 relative to the axle 23.

The circular main walls 38 and 39 have respective shallow recesses 43 and 44 in the outer surfaces thereof, the size and shape of which are substantially identical to the size and shape of the lower ends of the flanges 13 and 14, respectively. The flanges 13 and 14 are each disposed in a respective one of the recesses 43 and 44, the oppositely facing surfaces of the flanges 13 and 14 being substantially flush with the oppositely facing surfaces of the end cap wall portions 38 and 39, and the peripheral edges of the flanges 13 and 14 engaging the peripheral edges of the recesses 43 and 44 and thereby preventing rotation of the flanges 13 and 14 relative to the end caps 21 and 22 about the axle 23.

Arcuate flanges 46 and 47 are provided at the radially outer peripheral edges of the respective end caps 21 and 22 and project axially inwardly toward the wheel 28 in the region of the web 32 thereof. The ends 48 and 49 (FIG. 3) of the flange 46 are spaced angularly by approximately 65°, the flange end 49 being located rearwardly of and approximately horizontally aligned with the axle 23 and the flange end 48 being offset upwardly and rearwardly from the axle 23. The flange 46 could be described in a slightly different manner as an annular flange having an opening therethrough in the upper rear portion thereof. The flange 47 is, of course, a mirror image of the flange 46, a flange end 52 thereof being visible in relief in FIG. 2.

A cylindrical opening 53 is provided through the circular main wall 38 of the end cap 21 in the region of the flange end 48, the axis of the cylindrical opening 53 being substantially parallel to the axle 23. A cylindrical opening 54 is provided in the end cap 22 in a mirror image fashion and is axially aligned with the opening 53.

Figure 5:
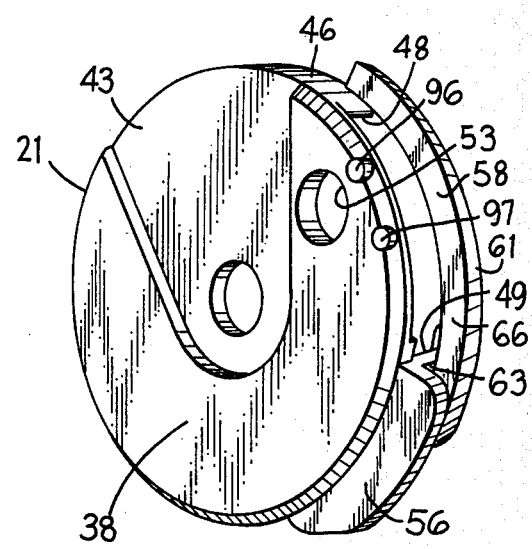
FIG. 5 is a perspective view of an end cap which is a component of the braking mechanism of FIG. 1.

A radially outward projection 56 (FIGS. 1 and 5) is integrally provided on the periphery of the end cap 21 in the region of the flange end 49 and is preferably a substantially platelike projection which is approximately coplanar with the circular main wall 38 of the end cap 21. An elongated, arcuate braking shoe 58 has its one end integrally fixed to the axially inner surface of the projection 56 and extends away therefrom and parallel to the periphery edge of the walls 38 and 39. Further, the shoe 58 is initially positioned adjacent and spaced slightly from the annular braking surface 36 on the wheel 28. The braking shoe 58 is also concentric with and spaced radially from the flange 46, a slot 63 existing therebetween. In effect the braking shoe 58 has its ends located adjacent the flange ends 48,49 of the flange 46 and extends across the spacing between the flange ends. An arcuate braking shoe 59 is provided in a mirror image fashion on the end cap 22. Referring to FIG. 2, the axially facing surfaces 66 and 67 of the braking shoes 58 and 59 are spaced axially inwardly of the axially inwardly facing surfaces 68 and 69 of the walls 38 and 39 of the end caps 21 and 22.

The braking shoes 58 and 59 each have a cross sectional shape which is a parallelogram, as shown in FIGS. 2 and 4. Respective braking surfaces 61 and 62 are provided on the radially outer surfaces of the braking shoes 58 and 59 and face the annular braking surfaces 36 and 37 on the wheel 28. The braking shoes 58 and 59 are normally in a position in which the braking surfaces 61 and 62 thereon are spaced slightly from the braking surfaces 36 and 37 on the wheel 28. The braking shoes 58 and 59 are each stiff but resiliently and elastically flexible, so that a radially outward force applied thereto near the free ends thereof will elastically flex the braking shoes 58 and 59 generally radially outwardly to a braking position in which the braking surfaces 61 and 62 thereon are in firm frictional engagement with the braking surfaces 36 and 37 on the wheel 28. In effect, this elastic flexing of the braking shoes 58 and 59 of the preferred embodiment increases the radius of the arcuate curvature thereof.

A manually actuable lever 76 is generally U-shaped and has a bight 77 and two spaced, parallel legs 78 and 79 which extend radially inwardly on opposite sides of the wheel 28 and between the flange ends of the flanges 46 and 47 through the slots 63 to locations adjacent the inner surfaces 68 and 69 of the end caps 21 and 22. The braking shoes 58 and 59 are disposed adjacent and axially inward of the lever arms 78 and 79. Respective, axially outwardly projecting cylindrical lugs 81 and 82 are provided at the free ends of the lever legs 78 and 79 and have, in this embodiment, diameters substantially equal to the diameters of the cylindrical openings 53 and 54 provided in the end caps 21 and 22. The cylindrical lugs 81 and 82 are substantially coaxial, and each is rotatably received in a respective one of the cylindrical openings 53 and 54, thereby supporting the lever 76 on the end caps 21 and 22 for pivotal movement between a raised position illustrated in solid lines in FIG. 3 and a lowered position illustrated in broken lines in FIG. 3. The end surfaces of the arcuate flanges 46 and 47 on the end caps 21 and 22 serve as stops which cooperate with surfaces on the legs of the lever 76 to limit pivotal movement of the lever 76 beyond the raised and lowered positions thereof.

Respective axially inward projections 86 and 87 are provided on the lever legs 78 and 79 adjacent the braking shoes 58 and 59 and radially offset from the axis of the cylindrical lugs 81 and 82. The inward projection 86, as shown in FIGS. 3 and 4, has a generally frustoconical shape, except that a flat surface 88 is provided on one side thereof. The frustoconical surface 91 thereon slidingly engages the side of the braking shoe 58 opposite the braking surface 61. The inward projection 87 is a mirror image of the projection 86, and has a frustoconical cam surface 92 thereon which engages the braking shoe 59.

As shown in FIG. 1, the end cap 21 has two small outward projections 96 and 97 thereon adjacent the peripheral edge of the circular wall 38 in the region of the cylindrical opening 53, and the lever 76 has an axial outward projection 98 on the outer surface of the leg 78 thereof near the peripheral edge of the circular wall 38 of the end cap 21. When the lever 76 is in its raised position, the projection 98 is approximately aligned with the projection 96 on the end cap 21, and when the lever 76 is in its lowered position, the projection 98 is approximately aligned with the projection 97 on the end cap 21.

The end cap 21, including the main wall 38, projection 41, flange 46, projection 56 and braking shoe 58, is preferably an integral part molded from a synthetic resin, as is the end cap 22. Similarly, the lever 76, including bight 77, legs 78 and 79, lugs 81 and 82, and projections 86 and 87, is preferably an integral part molded from a synthetic resin. One suitable synthetic resin is ABS (acrylonitrilebutadienestyrene).

It will be recognized that the inventive braking apparatus can be easily retrofit into an existing assembly which includes the bracket 11 and the wheel 28 rotatably supported thereon by the rivet 23. The rivet 23 would be drilled out and removed, the wheel 28 would be removed from the bracket, the lever 76 would be operatively coupled to the end caps 21 and 22 and the end caps 21 and 22 would then be placed on opposite sides of the wheel 28, the wheel 28 and end caps 21 and 22 would be inserted into the bracket 11, and a new rivet 23 or a bolt and nut would be used to hold the component parts in place, as in FIG. 2. Thus, the retrofit can be effected without modifying the bracket 11 or wheel 28. Moreover, if the existing assembly had a bolt and nut, rather than the rivet 23, the entire retrofit could be effected with only simple hand tools.

Figure 6:
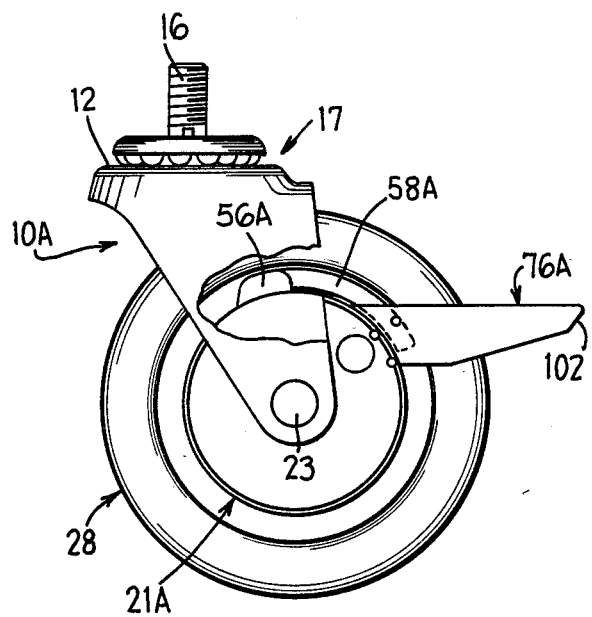
FIG. 6 is a fragmentary side view of an alternative embodiment of the braking mechanism of FIG. 1.

FIG. 6 illustrates a caster 10A which is an alternative embodiment of the caster 10 of FIG. 1. The caster 10A is substantially identical to the caster 10, except that the radial projection 56A which supports the braking shoe 58A on the end cap 21A is provided on top of the end cap 21A, and the braking shoe 58A extends along the top of the end cap 21A to a location near the lever 76A. The flange ends of the not illustrated annular flange on the end cap 21A are approximately aligned angularly with the ends of the braking shoe 58A. The outer end 102 of the lever 76A is beveled so as to be substantially parallel to the floor when the lever 76A is manually moved to its lowered position.

The embodiment of FIG. 6 is considered somewhat more aesthetically appealing than the embodiment of FIG. 1, because the radial projection 56A and a portion of the braking shoe 58A are normally hidden from view by the flange 13 of the yoke 12.

Figure 9:
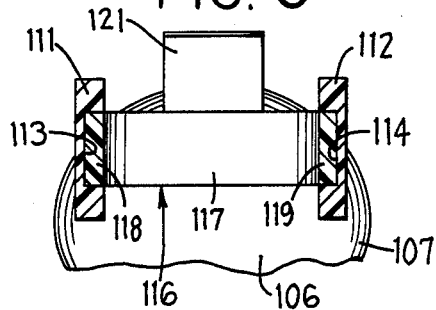
FIG. 9 is a sectional view taken along the line IX—IX of FIG. 7.
Figure 8:
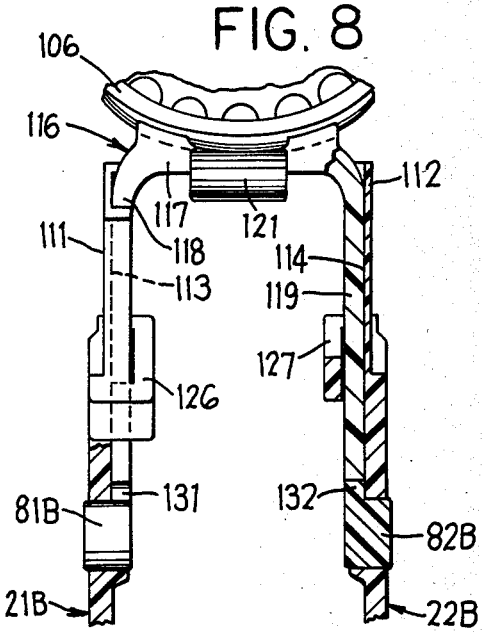
FIG. 8 a sectional view taken along the line VIII—VIII of FIG. 7.
Figure 7:
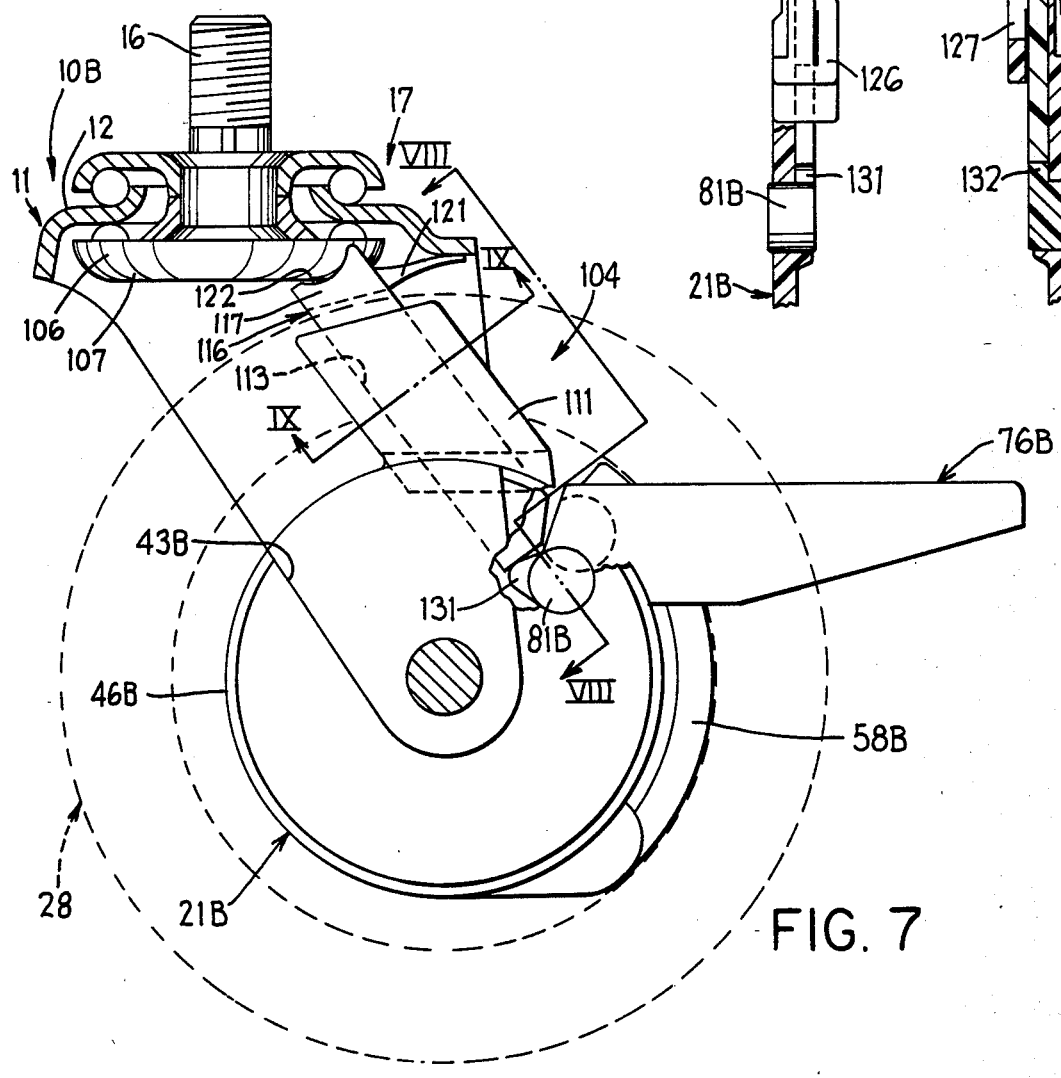
FIG. 7 is a sectional side view of a further alternative embodiment of the braking mechanism of FIG. 1.

The embodiment of FIGS. 7-9 is substantially identical to the embodiment of FIGS. 1-5, except that it includes a braking mechanism 104 for preventing rotation of the yoke 11 relative to the kingpin 16. Accordingly, only the further braking mechanism 104 is described in detail.

As mentioned above, the bearing arrangement 17 which facilitates the rotatable support of the yoke 11 on the kingpin 16 is substantially identical to that disclosed in U.S. Pat. No. 4,219,903 and it is therefore described only briefly. It includes a central opening in the bight 12 of the yoke 11 through which the inverted kingpin 16 extends, upper and lower bearing races secured to the kingpin 16 and disposed on opposite sides of the bight 12, and a plurality of ball bearings disposed between the respective bearing races and the bight 12 of the yoke 11. The outer surface 107 of the lower bearing race serves as an annular braking surface as described hereinafter.

Respective upward projections 111 and 112 are provided on the tops of the end caps 21B and 22B and extend toward the rearmost portion of the annular braking surface 107 with a forward incline. Respective rectilinear recesses or grooves 113 and 114 (FIG. 9) of generally rectangular cross section are provided in the projections 111 and 112 and extend in a direction defined approximately by a line extending between the rearmost portion of the braking surface 107 and the axis of the cylindrical lugs 81B and 82B of the lever 76B. The grooves 113 and 114 preferably extend through the arcuate flanges provided at the peripheral edges of the end caps 21B and 22B.

A U-shaped braking element 116 (FIG. 8) has a bight 117 and two spaced legs 118 and 119, the legs 118 and 119 being respectively slidably received in the grooves 113 and 114, and the bight 117 being located adjacent the lower bearing race 106. The bight 117 has a resiliently flexible projection 121 extending outwardly therefrom in a direction substantially normal to the bight 117 and to the legs 118 and 119. The outer end of the projection 121 slidably engages the underside of the bight 12 of the yoke 11 at the rear end thereof. The bight 117 of the braking element 116 has a concave braking surface 122 on the upper side thereof which faces the correspondingly shaped convex braking surface 107 on the bearing race 106.

The braking element 116 is movable between actuated and deactuated positions in which the braking surface 122 is respectively engaging and free of engagement with the braking surface 107 on the bearing race 106.

The end caps 21B and 22B preferably include retainers 126 and 127 which extend across the grooves 113 and 114 near the lower ends thereof to maintain the lower ends of the braking element legs 118 and 119 in the grooves 113 and 114.

The lever 76B is substantially identical to the lever 76 of FIG. 1, except that respective radially projecting cams 131 and 132 are provided on the cylindrical lugs 81B and 82B thereof and are engageable with the lower ends of the legs 118 and 119 of the braking element 116.

It will be recognized that the caster braking mechanism 104 could also be incorporated into the embodiment of FIG. 6.

OPERATION

The embodiment of FIGS. 1-5 operates in the following manner. The lever 76 is normally in its raised position, as shown in solid lines in FIG. 3, and the elastic memory of the material of the braking shoes 58 and 59 keep them in positions in which the braking surfaces 61 and 62 thereon are spaced slightly from the braking surfaces 36 and 37 on the wheel 28, as shown in FIG. 2. The braking mechanism thus has little or no effect on rotation of the wheel 28, permitting the apparatus supported on the caster 10 to be moved freely from place to place.

When it becomes necessary to engage the braking mechanism to prevent rotation of the wheel 28, the lever 76 is manually moved to the lowered position illustrated in broken lines in FIG. 3. As the lever 76 is moved downwardly, the cam surfaces 91 and 92 on the legs 78 and 79 of the lever engage and slide along the braking shoes 58 and 59 and flex them radially outwardly to a braking position in which the braking surfaces 61 and 62 thereon are in firm engagement with the braking surfaces 36 and 37 on the wheel 28. Since the braking shoes are fixed to the end caps 21 and 22 and the end caps are fixed against rotation with respect to the yoke 11, the firm frictional engagement between the braking shoes 58 and 59 and the wheel 28 prevents rotation of the wheel 28 relative to the yoke 11. As shown in broken lines in FIG. 3, the cam surface 91 has moved slightly past a position of dead center engagement with the braking shoe 58 when the lever is in the lowered position, and thus tends to resist inadvertent upward movement of the lever 77. The braking mechanism is subsequently released by manually raising the lever 76 to its original position, the elastic memory of the material of the braking shoes causing them to move radially inwardly to their original, retracted position and thus out of firm engagement with the wheel 28.

A visual indication of whether or not the braking mechanism is actuated is provided by the projection 98 on the lever 76, which will be substantially aligned with the projection 96 on the end cap 21 when the lever 76 is in its raised position and substantially aligned with the projection 97 on end cap 21 when the lever 76 is in its lowered position.

The end caps 21 and 22 help to protect the bearing arrangement 17 (FIG. 1) from the elements, including dust, dirt and precipitation.

The embodiment of FIG. 6 operates in a manner substantially identical to that of the embodiment of FIGS. 1-5, and such operation is therefore not described in detail.

The embodiment of FIGS. 7-9 includes a braking mechanism for the wheel 28 which is substantially identical to that of the embodiment of FIGS. 1-5 and is actuated in a similar manner by the lever 76B. In addition, the embodiment of FIGS. 7-9 includes the braking mechanism 104, which operates in the following manner.

When the lever 76B is moved downwardly to actuate the braking mechanism which locks the wheel 28, the cams 131 and 132 thereon cooperate with the lower ends of the legs 118 and 119 of the braking element 116 and urge the braking element upwardly until the braking surface 122 thereon is in firm frictional engagement with the braking surface 107 on the lower bearing race 106. Since the bearing race 106 is securely fixed to the kingpin 16, relative rotation of the kingpin 16 and yoke 11 is prevented. The resilient projection 121 is flexed as the braking element 116 moves upwardly, and continuously urges the braking element 116 downwardly.

When the lever 76B is raised to release the braking mechanism for the wheel 28, the cams 131 and 132 return to their original positions and permit the braking element 116 to move downwardly under the urging of the resilient projection 121 until the braking surface 122 thereon is free of engagement with the braking surface 107 on the bearing race 106. The yoke 11 is then free to pivot again relative to the kingpin 16.

Although preferred embodiments of the invention have been disclosed in detail for illustrative purposes, it till be recognized that the scope of the present invention includes a number of variations or modifications of the disclosed embodiments, including the rearrangement of parts.

The embodiments of the invention in which an exclusive property or privilege is claimed are defined as follows:

1. A wheel braking apparatus, comprising:
    a bracket which includes spaced first and second flanges;
    an axle which extends between and has its ends fixedly supported on said flanges;
    a wheel rotatably supported on a bearing means on said axle between said flanges, said wheel having means defining a tread on a periphery thereof and having means defining a generally annular and radially inwardly facing first braking surface concentric with said axle and located radially between said axle and said tread;
    an end cap which is disposed between said wheel and said first flange of said bracket and includes a generally circular wall which is concentric with and extends radially of said axle, which has a central opening through which said axle extends, and which has a recess in an outwardly facing surface thereof which has a shape substantially congruent with that of a portion of said first flange of said bracket supporting said axle, said first flange being disposed in said recess to prevent rotation of said end cap about said axle relative to said bracket; said end cap further including an annular flange projecting axially toward said wheel from peripheral edges of said circular wall, said circular wall and said annular flange thereby defining a shield for shielding said bearing means from dust, threads and the like, means defining an opening in said annular flange, and an elongate, arcuate, resiliently flexible brake shoe extending along said first braking surface adjacent thereto and having one end fixedly supported on said annular flange in the region of one end of said opening therein; said braking shoe having thereon a generally radially outwardly facing second braking surface which is adjacent and faces said first braking surface on said wheel, being normally in a retracted position in which said second braking surface is substantially free of engagement with said first braking surface, and being movable through generally radially outward flexing from said retracted position to a braking position in which said second braking surface is firmly engaging said first braking surface so as to prevent relative rotation of said wheel and bracket about said axle, said resilient of said brake shoe continuously urging said brake shoe toward said retracted position thereof; wherein said circular wall, annular flange and braking shoe are all integral parts of said end cap; and
    manually actuable means cooperable with said braking shoe for effecting movement of said braking shoe between its braking and retracted positions, said manually actuable means including a lever supported on said end cap for movement within a range bounded by first and second positions and having means cooperable with said brake shoe at a location thereon spaced from said one end of said brake shoe for radially flexing said brake shoe as said lever moves from said second to said first position to effect said radial movement of said brake shoe from its retracted to its braking position, said end cap and said circular wall and said annular flange thereon, as well as said lever, all being oriented between said first and second flanges.

2. The apparatus according to claim 1, wherein said lever is supported on said end cap for pivotal movement between said first and second positions about an axis extending generally parallel to said axle and has a cam surface thereon engageable with said brake shoe on a side thereof opposite said second braking surface for effecting said radial movement of said brake shoe from said retracted position to said braking position in response to pivotal movement of said lever.

3. The apparatus according to claim 2, wherein said wheel has a said first braking surface on each side thereof; including a further said end cap which is substantially a mirror image of said first-mentioned end cap and is provided between said wheel and said second flange of said bracket; and wherein said lever is generally U-shaped and has two legs which are disposed on opposite sides of said wheel, each said leg being pivotally supported on a respective said end cap and having a said cam surface thereon cooperable with said brake shoe on the associated end cap, said two legs of said lever and said two end caps being oriented between said first and second flanges.

4. The apparatus according to claim 3, including a bracket support, said bracket being supported on said bracket support for pivotal movement about a generally vertical second axis, said bracket support having a swivel brake means comprising a generally annular third braking surface thereon concentric with said second axis; including a braking element having a fourth braking surface thereon and means supporting said braking element for movement between actuated and deactuated positions in which said fourth braking surface is respectively in firm engagement with and substantially free of engagement with said third braking surface; and wherein said lever has means cooperable with said braking element for moving said braking element in response to movement of said lever, said braking shoe and said braking element respectively moving from said retracted and deactuated positions to said braking and actuated positions as said lever is moved from said second to said first position, the aforesaid swivel brake means being oriented between said first and second flanges.

5. The apparatus according to claim 4, including second bearing means for effecting said rotatable support of said bracket on said bracket support, said second bearing means including at least one annular bearing race supported on said bracket support, said third braking surface being an outer surface of said annular bearing race.

6. The apparatus according to claim 4, including resilient means for yieldably urging said braking element toward said deactuated position;
  wherein each said leg of said lever has a further cam surface thereon; and
  wherein said braking element is generally U-shaped and has a bight and two legs, said legs of said braking element being disposed on opposite sides of said wheel, said fourth braking surface being provided on said bight of said braking element, and said further cam surfaces on said lever being cooperable with said legs of said braking element at locations remote from said bight for effecting said movement thereof in response to movement of said lever.

7. The apparatus according to claim 6, wherein said resilient means includes a resiliently flexible tab integral with and projecting outwardly from said bight of said U-shaped member, an outer end of said tab engaging a surface on said bracket and said tab being resiliently flexed as said braking element is moved from said retracted to said braking position.

8. The apparatus according to claim 7, wherein said means movably supporting said braking element includes an upward projection on each said end cap integral therewith and an elongate recess in an axially inwardly facing surface of each said projection, each said leg of said braking element being slidably received within a respective said elongate recess.

9. The apparatus according to claim 8, including means on each said end cap cooperable with said leg of the associated braking element near an end thereof remote from said bight for retaining the leg in said elongate recess therein.

10. The apparatus according to claim 3, wherein each said end cap has a second generally cylindrical opening in said circular wall thereof coaxial with said axis, and wherein said lever has near a free end of each said leg thereof a generally cylindrical lug which is rotatably received within said second cylindrical opening in the associated end cap to effect said pivotal support of said lever on said end caps, each said leg of said lever extending through said opening in said annular flange of the associated end cap.

11. The apparatus according to claim 10, wherein said end caps and said lever are made of a moldable synthetic material.

12. The apparatus according to claim 10, wherein each said end cap has stop means cooperable with said legs of said lever for preventing movement of said lever beyond said first and second positions thereof, said stop means including said opening in said annular flange of each said end cap having surfaces engageable with surfaces on the associated leg of said lever when said lever is in said first and second positions.

13. The apparatus according to claim 1, including a bracket support, said bracket being supported on said bracket support for pivotal movement about a generally vertical second axis, said bracket support having a swivel brake means comprising a generally annular third braking surface thereon concentric with said second axis; including a braking element having a fourth braking surface thereon and means supporting said braking element for movement between actuated and deactuated positions in which said fourth braking surface is respectively in firm engagement with and substantially free of engagement with said third braking surface; and wherein said lever has means cooperable with said braking element for moving said braking element in response to movement of said lever, said braking shoe and said braking element respectively moving from said retracted and deactuated positions to said braking and actuated positions as said lever is moved from said second to said first position, the aforesaid swivel brake means being oriented between said first and second flanges.

14. The apparatus according to claim 13, including second bearing means for effecting said rotatable support of said bracket on said support member, said second bearing means including at least one annular bearing race supported on said support member, said third braking surface being an outer surface of said annular bearing race.

15. The apparatus according to claim 13, including resilient means for yieldably urging said braking element toward said deactuated position, said resilient means including a resiliently flexible tab integral with and projecting outwardly from said braking member, an outer end of said tab engaging a surface on said bracket and said tab being resiliently flexed as said braking element is moved from said retracted to said braking position.

16. The apparatus according to claim 15, wherein said means movably supporting said braking element includes an upward projection on said end cap integral therewith and means on said upward projection integral therewith and cooperable with said braking element for effecting said movable support of said braking element.

* * * * *